United States Patent [19]

Griffen et al.

[11] 4,453,609

[45] Jun. 12, 1984

[54] COMPENSATED LOAD CELL

[75] Inventors: Neil C. Griffen; David M. Behrman, both of Columbus, Ohio

[73] Assignee: Reliance Electric Company, Cleveland, Ohio

[21] Appl. No.: 358,195

[22] Filed: Mar. 15, 1982

[51] Int. Cl.³ .................. G01G 3/14; G01L 1/22
[52] U.S. Cl. ....................... 177/211; 73/862.65
[58] Field of Search ............... 177/211; 73/862.65

[56] References Cited

U.S. PATENT DOCUMENTS

| | | | |
|---|---|---|---|
| 3,477,532 | 11/1969 | Wilder | 177/211 |
| 3,554,025 | 1/1971 | Andersson et al. | 177/211 X |
| 3,576,128 | 4/1971 | Lockery | 177/211 X |
| 3,707,076 | 12/1972 | Jones | 177/211 X |
| 4,146,100 | 3/1979 | Jacobson et al. | 177/211 |
| 4,150,729 | 4/1979 | Ormond | 177/211 |
| 4,219,089 | 8/1980 | Gard et al. | 177/211 X |
| 4,380,175 | 4/1983 | Griffen | 177/211 X |

OTHER PUBLICATIONS

Perry, C. C. et al, The Strain Gage Primer, 1967, McGraw-Hill Book Company, pp. 160-167.

Primary Examiner—George H. Miller, Jr.
Attorney, Agent, or Firm—Roy F. Hollander

[57] ABSTRACT

This invention relates to new and improved single beam load cells which are compensated for both longitudinal and lateral displacement of the load; to new and improved scale arrangements incorporating such load cells; and to methods of compensating such single beam load cells. In one embodiment of the invention strain gages are attached to only one side of the beam and the beam is honed or filed to compensate for both longitudinal and lateral displacement of the load. In another embodiment of the invention strain gages are placed on both sides of the single beam and the strain gages are placed on the beam at a slight angle from the longitudinal axis of the beam. In this embodiment the beam may be honed to compensate for both lateral and longitudinal displacement of the load. In addition, with the strain gages displaced at a small angle with respect to the longitudinal axis of the beam, the load cell may be compensated for both longitudinal and transverse displacement of the load by placing resistors in parallel with two or more of the strain gages.

The single beam is mounted or supported at one end thereof and the other end supports the platter or platform of the scale arrangement. The platter or platform mounting arrangements may be arranged to provide moment insensitive arrangements, and in one exemplary embodiment the platform or platter is supported by one end of the single beam load cell at or near an edge thereof.

20 Claims, 12 Drawing Figures

COMPENSATED LOAD CELL

BACKGROUND OF THE INVENTION

The present invention relates to improved single beam load cells which are compensated for both longitudinal and lateral displacement of the load on the scale mechanism and to methods of compensating such load cells as well as improved scale arrangements incorporating such improved load cells.

U.S. Pat. No. 3,576,128 granted Apr. 27, 1971 to Lockery discloses a dual beam load cell compensated for longitudinal displacement of the load. Copending application of Griffen Ser. No. 272,928 filed June 12, 1981 discloses an improved compensating arrangement for a dual beam load cell. U.S. Pat. No. 4,282,748 granted Aug. 11, 1981 to Lockery et al relates to a single beam load cell wherein the radius of a fillet between the load section and the mounting section is adjusted so that the load cell becomes substantially insensitive to inboard-outboard loading. Such adjustments are difficult to make, time-consuming and expensive.

SUMMARY OF THE INVENTION

This invention relates to load cells comprising a single beam flexing element or beam. In one version or exemplary embodiment of the invention strain gages are all mounted on one surface or side of the beam and notches cut in the other side of the beam. In accordance with the present invention it has been discovered that the output of such a load cell may be made substantially independent of the longitudinal position of the load or weight by properly shaping the notches or reduced sections of the beam. One way of shaping the reduced sections is to selectively file or hone at or near the bottom of the notches at one or the other ends of the beam or bar. In addition, the output of the load cell may be made substantially independent of the lateral displacement of the load or weight by further shaping the notches or reduced sections by selectively filing or honing one or the other sides of one or more of the notches.

Another aspect or exemplary embodiment of the invention comprises a single beam or bar load cell in which the reduced sections are formed by notches cut in the edges of the beam or bar. With this arrangement the load cell, similarly, may be made substantially independent of the longitudinal position of the load or weight on the scale by selectively filing or honing at or near the bottom of one or more of the notches. In accordance with the present invention it has been discovered that the output of the load cell may be made substantially independent of the lateral location of the weight on the scale incorporating such a load cell by selectively honing or filing one or the other sides of one or more of the notches.

Also in accordance with the present invention it has been discovered that it is possible to compensate for off-center loading of the weighing mechanism incorporating such a beam by connecting resistor networks to the strain gages if the strain gages are placed upon the beam at an angle with the longitudinal axis of the beam. Some of the strain gages are oriented at a clockwise angle while others are oriented at a counterclockwise angle.

Any of the above described versions of the load cell may be employed to provide the major support of the scale platform or platter. In addition, forces may be transmitted from the scale platform or platter to the single beam of the load cell by means of force transmitting elements to provide a moment insensitive arrangement of the scale and load cell arrangements. Also in accordance with the present invention the load cell may be incorporated in a scale by supporting the platform or platter at or near the edge thereof which again provides a moment insensitive arrangement of the scale and load cell arrangement. In addition, the strain gages are connected in an electrical bridge circuit arrangement and at least one pair of resistors are connected to at least one pair of strain gages to make the output of the bridge circuit substantially independent of the location of the load or weight on the scale. Sometimes it may be desirable to employ both abovementioned methods to make the output of the load cell independent of the location of the load or weight on the scale. In this respect, it may be desirable to both hone the single beam of the load cell as described above and, in addition, connect resistor networks to selected ones of the pairs of strain gages.

A further aspect of the invention is to incorporate the improved load cells in improved and inexpensive scale arrangements. Thus, the load cell is supported at one end on a base, and the other end of the load cell supports the platform or platter. Arrangements may also be provided to transmit the load from the platter to the end of the load cell by moment insensitive means. A novel scale arrangement in accordance with the present invention supports the scale platform or platter at or near an edge thereof on one end of the load cell.

GENERAL DESCRIPTION

Figure 1:
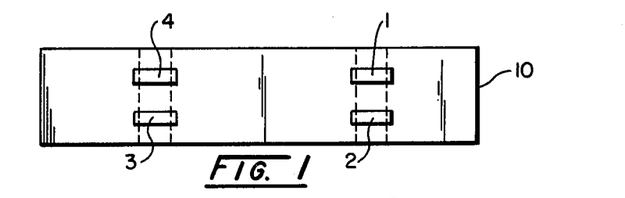
FIG. 1 is a plan or top view of an exemplary embodiment of the load cell in accordance with this invention.
Figure 2:
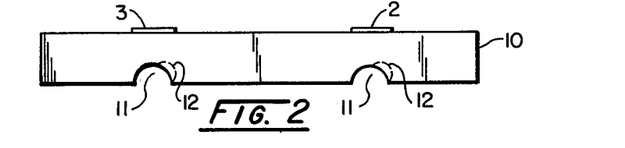
FIG. 2 is a side view of the load cell of FIG. 1.

FIGS. 1 and 2 show an exemplary embodiment of the force responsive member of the new improved load cell in accordance with the present invention. This force responsive member comprises a single flexure member or beam 10. As shown in FIGS. 1 and 2, this beam member 10 is of rectangular cross-section. However, it is not essential that the cross-section be rectangular, but may be of any other suitable shape or configuration. This member is arranged to be supported at one end, the right-hand end as shown in FIG. 1, while the force or load is applied to the left-hand end. However, since the beam as shown in FIG. 1 of the exemplary embodiment of the invention described herein is essentially symmetrical, the beam may be supported at the left-hand end and have the load applied to the right-hand end when desired.

FIGS. 1 and 2 illustrate that the exemplary embodiment of the invention has two reduced sections formed by notches cut in the underside of the beam or flexure member 10. As shown in FIGS. 1 and 2, these notches are placed relatively close to the ends of the single bar or load responsive element. Strain gages are applied to the top side of the bar at or near the reduced sections.

A feature of the invention relates to adjusting the single beam for off-center loading. If a single beam or flexing element of a single beam load cell were uniform and completely symmetrical, it would be theoretically possible for the weight to be moved around on the platter without affecting the accuracy of the response of the load cell. However, in practice, errors due to shifting of the load to different positions on the platform generally arise from slight variations of many factors. Some of these factors that may affect the accuracy of the weight measurement when the load is shifted off-center on the scale platform or platter include: (1) small variations in the position of the strain gages on the beam, (2) variations in the bonding of the strain gages to the beam, (3) strain gage geometry variations, (4) strain gage resistance variations, (5) strain gage factor variations, (6) variations in the load cell geometry, (7) variation in the thickness of the reduced sections of the beam, (8) variation in the location of the reduced sections, (9) variations in the geometry of the reduced sections of the beam, (10) variations in the compensation of the load cell beam, (11) variation in the strain in the load cell due to machining and other factors, and (12) variations in the lead wires to the connecting circuitry.

While in the past it has been possible to correct for longitudinal shifting of the load on the platform or platter by shaping the reduced sections through honing or filing, such shaping has not produced satisfactory results with respect to shifting of the load in the lateral direction, at right angles to the longitudinal axis of the load cell beam. In order to correct or compensate for longitudinal off-center loading, the notch or notches at one end or the other are filed or honed at or near the bottom thereof. This filing at the bottom tends to slightly reduce the cross-section of the beam at this point. Filing continues until the desired corrections are obtained ad the output of the load cell is substantially independent of the location of the weight or load in a longitudinal direction. Previously, it has been impossible to correct for lateral displacement of the load on the platter or platform of the scale. In accordance with the present invention it has been discovered that the lateral displacement of the load may be compensated for by filing or honing selectively the sides of one or more of the slots 11 as indicated at 12.

Figure 3:
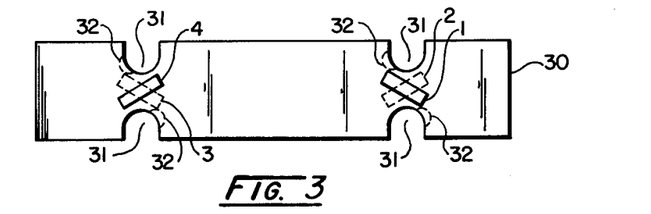
FIG. 3 is a top or plan view of another embodiment of the load cell in accordance with this invention.
Figure 4:
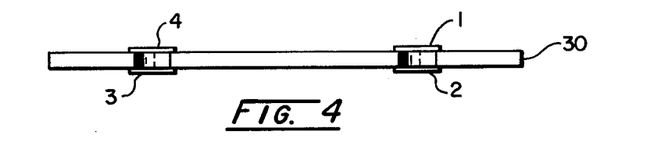
FIG. 4 is a side view of the load cell of FIG. 3.

FIGS. 3 and 4 show another exemplary embodiment of the force responsive member or single beam of the new and improved load cell in accordance with the present invention. This force responsive member or beam comprises a single flexure member 30 which is shown to have a rectangular cross-section. However, it is not essential that the cross-section be rectangular and may be of any other suitable shape or configuration. This member is arranged to be supported at one end, the right-hand end as shown in FIGS. 3 and 4, with the force of load applied to the left-hand end. Since the beam of FIGS. 3 and 4 of the exemplary embodiment is essentially symmetrical, the beam may be supported at the left-hand end and have a load applied to the right-hand end when desired.

As shown in FIG. 3, the exemplary embodiment of the invention has two reduced sections, one near each end of the beam. These reduced sections are formed by notches 31 cut into the edges of the beam. The notches are not essential, but are usually provided since they increase the sensitivity of the load cell.

A feature of this embodiment of the invention relates to the adjustment of the load cell for off-center loading similar to the arrangement of the exemplary embodiment of the invention shown in FIGS. 1 and 2 and described above. In order to correct or compensate for longitudinal off-center loading, one or both reduced sections of the beam are shaped by selectively honing or filing one or more of the notches at or near the bottom until the desired correction is obtained. However, as pointed out above, it had previously been impossible to correct for lateral displacement of the load by honing of the notches in the beam. In accordance with the present invention it has been discovered that lateral displacement of the load may be compensated for by filing or honing the sides of one or more of the slots 31 as indicated at 32.

As shown in FIGS. 3 and 4, strain gages 1 through 4 are applied to the single beam at or near the reduced cross-sections. Gages 1 and 4 are applied to the top side of the beam 30 while gages 2 and 3 are applied to the bottom side. In accordance with one aspect of the invention, it has been discovered that it is possible to compensate for off-center loading of the scale arrangement incorporating such a beam by connecting resistor networks to the strain gages if these strain gages are placed upon the beam at a slight angle to the longitudinal axis of the beam as shown in FIG. 3. The angle may be up to 10 or more degrees from the longitudinal axis. In accordance with the exemplary embodiment described herein, this angle is of the order of 5 degrees. As shown in FIG. 3, the angle is formed by rotating strain gage 4 counterclockwise, when applied to the beam, while the angle is clockwise when the gage 1 is applied to the beam. Similarly, gages 2 and 3 are applied to the under side of the beam by rotating the gages opposite to the corresponding gages on the top side of the beam.

Figure 5:
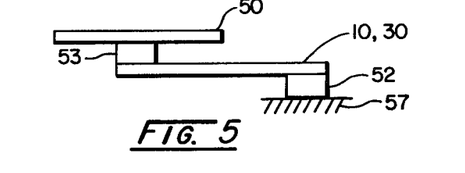
FIG. 5 is a side view of an exemplary scale in accordance with the present invention incorporating the load cell of either FIGS. 1 or 3.

FIG. 5 shows a novel scale arrangement incorporating a single beam load cell in accordance with this invention. The single beam load cell 10-30 may be of the type shown in FIGS. 1 and 2 or in FIGS. 3 and 4. The load cell beam is secured to base 51 by support 52. The opposite end of the load cell has the platter 50 secured thereto by the support member 53. As shown in FIG. 5, the support member 53 is attached to approximately the center of the platter or platform 50. By thus incorporating the load cell in the scale arrangement, a compact, inexpensive and relatively simple scale structure is achieved.

Figure 6:
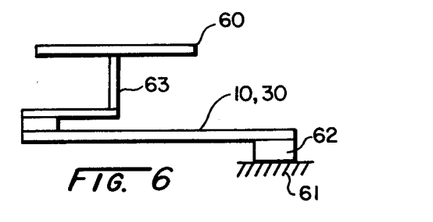
FIG. 6 is a side view of another exemplary embodiment of the invention incorporating the load cell of either FIGS. 1 or 3, arranged to be moment insensitive.

FIG. 6 shows a similar novel scale arrangement incorporating a single beam load cell in accordance with this invention. This single beam load cell 10-30 may likewise be constructed in accordance with either the load cell beam 10 of FIGS. 1 and 2 or the load cell beam 30 of FIGS. 3 and 4. In the scale arrangement shown in FIG. 6 the load cell beam 10-30 is secured to base 61 by load cell support 62. The opposite end of the load cell has the platter 60 secured thereto by means of a support member 63. This support member positions the center of the platter over substantially the center of the load cell, thus providing a moment insensitive scale arrangement which requires less longitudinal compensation.

Figure 7:
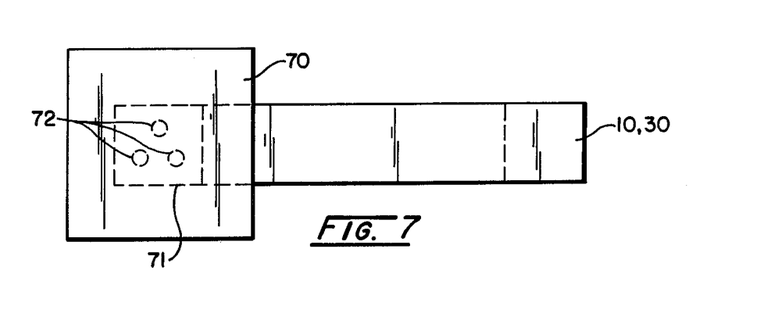
FIG. 7 is the top view of an exemplary embodiment of a novel scale arrangement in accordance with the invention incorporating the load cell in accordance with either FIGS. 1 or 3 in which the platter is supported by the load cell through three ball bearings which prevent transmission of lateral forces from the platter to the load cell.
Figure 8:
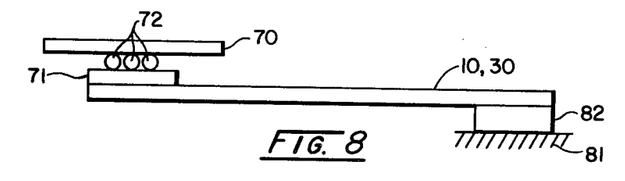
FIG. 8 is a side view of the arrangement shown in FIG. 7.

FIGS. 7 and 8 show novel improved exemplary scale arrangements incorporating a single beam load cell in accordance with this invention. This single beam load cell 10-30 may again be in accordance with the load cell beam 10 of either FIGS. 1 and 2 or the load cell beam 30 of FIGS. 3 and 4. The load cell beam 10-30 is secured to base 81 by support 82. The platter 70 is supported by three balls 72 which are in turn supported on plate 71 attached to the end of the beam 10-30. The balls are held in depressions in either or both the plate 71 and the underside of the platter 70. In this arrangement, lateral forces or the lateral component of forces applied to the platter are attenuated or reduced as applied to the beam 10-30 and thus do not materially affect the accuracy of the weight measurements.

Figure 9:
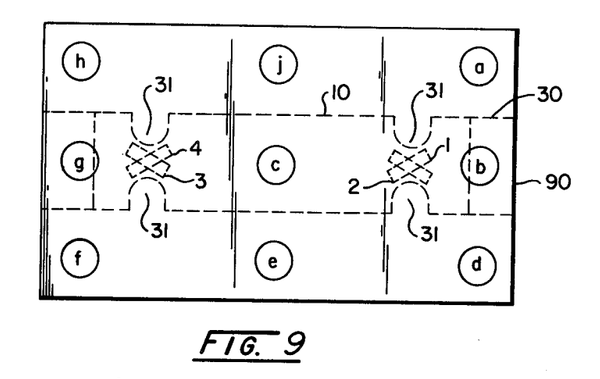
FIG. 9 is a top view of an exemplary embodiment of the novel scale arrangement in accordance with the present invention incorporating the load cell of either FIGS. 1 or 3 arranged to be moment insensitive by supporting the platter or platform at or near an edge thereof by one end of a load cell.
Figure 10:
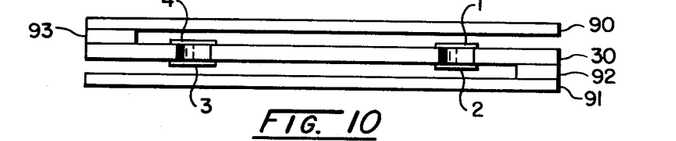
FIG. 10 is a side view of the scale arrangement shown in FIG. 9.

FIGS. 9 and 10 show a new and improved scale arrangement incorporating the load cell 30 shown in FIGS. 3 and 4. The scale arrangement comprises a base member 91, a load cell 30 and a platter or weight receiving member 90. The load cell 30 is secured to base 91 at the right-hand end as seen in FIGS. 9 and 10 by support member 92, while the platter 90 is secured to member 30 or near its left-hand edge by a support member 93.

When the load cell in accordance with FIGS. 3 and 4 is incorporated in a scale such as those shown in FIGS. 5, 6, 7 and 8, or 9 and 10, compensations for off-center loading may be obtained by connecting resistor networks to two or more of the strain gages. In accordance with the copending application, Ser. No. 272,928, it had been discovered that when using a dual beam load cell with certain of the strain gages displaced towards one edge of one beam and others of the strain gages displaced towards another edge of the other beam it is possible to compensate for both longitudinal and transverse displacement of the load by connecting resistors to selected strain gages. However, this arrangement has not proved satisfactory for a single beam load cell structure.

In accordance with the present invention, by rotating certain of the strain gages in one direction from the longitudinal axis of the single beam and others in the opposite direction, it has been discovered that the errors due to displacement of load either in the longitudinal or transverse direction may be compensated for by connecting resistors to selected ones of the strain gages. As described with reference to FIGS. 3 and 4, all four of the strain gages have been rotated in one direction or the other. However, it is not essential that all of these be so rotated since some correction may be obtained by rotating just selected ones of the strain gages. Since there is no known method of determining beforehand the value of such resistors or the amount or position of material which should be removed from the load cell structure, it is necessary to test each of the load cell structures individually.

Figure 11:
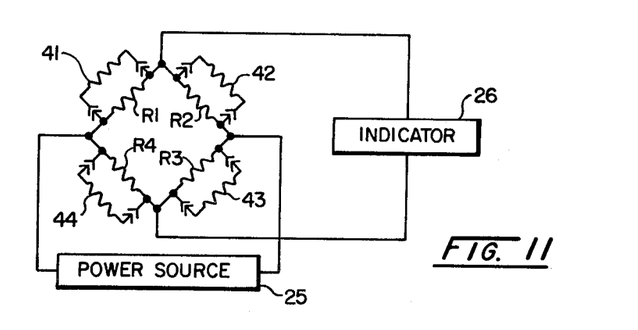
FIG. 11 shows a suitable electrical bridge arrangement for interconnecting the strain gages and for connecting compensating resistor networks to the strain gages.

After the load cell has been constructed and assembled as described above, the resistances ($R_1$, $R_2$, $R_3$ and $R_4$) of the strain gages are connected in a bridge circuit as shown in FIG. 11 so that the adjacent pairs of gages 1, 2; 2, 3; 3, 4; and 4, 1 on the load cell structure are electrically adjacent in the bridge circuit. One pair of bridge terminals is connected to power source 25 and the other pair of bridge terminals is connected to an indicator 26. The indicator may be calibrated in any desired units, but for convenience, the units will be referred to herein as counts. After the bridge circuit has been connected as described, a test weight is then applied to the platform and the output of the bridge circuit determined. At this time the compensating resistors 41, 42, 43 and 44 are not connected. As shown in the drawing, single compensating resistors are connected to the strain gages. However, any suitable type of resistor network may be employed including series resistors, parallel resistors or combinations of series and parallel resistors.

One method of determining the value of a resistor to compensate for longitudinal errors is to connect two similar variable resistors to the strain gages at one end or the other of the load cell. These resistors are simultaneously varied while the test weight is moved along the longitudinal axis until the output of the bridge is substantially constant for all positions of the test weight along the longitudinal axis. Similarly, two variable resistors are connected to the strain gages on either the top or bottom of the load cell and these varied as the test weight is moved laterally to different positions until the lateral movement of the test weight does not produce any variation in output of the bridge. This arrangement is satisfactory if correction is desired in only one direction, either longitudinal or transverse. However, there is an interaction between the transverse and longitudinal shift compensations if corrected independently. Whenever one compensation is made, it will change the amount of compensation required for shift of the other type. Thus, numerous corrections must be made in an iterative manner until the shift specifications are met. This approach is slow and costly.

A more direct method of determining the value of the resistor networks to be applied to the various strain gages is to apply a test weight at the corners of the scale platter at positions a, d, f and h as shown in FIG. 9. With a test weight at each of these positions, a pair of test resistors is connected to each of the pairs of adjacent strain gages and the output of the indicator determines the desired resistances. In the exemplary embodiment of the invention, for strain gages having a resistance of approximately 350 ohms, the value of suitable test resistors has been found to be approximately 4,000 ohms. Thus, while a test weight is in position a, the two test resistors are connected first to the strain gages 1 and 2, second to strain gages 2 and 3, next to 3 and 4, and finally to 4 and 1. The output of the indicator in each of these instances is employed as described. Next, the test weight is moved to position d and the above procedure repeated. It is then repeated with the test weight in positions f and h. From these test results, it is possible to calculate the desired compensating resistors which will accommodate displacement of the load or weight on the scale, both in the longitudinal direction and the lateral direction, if desired. The displacement may be corrected for only one of these directions when desired.

The effects of connecting resistors to different values in parallel with the strain gages may be calculated in the following manner. The output of a single strain gage is often expressed as $\Delta G/G$ where G is the resistance of the strain gage. If a shunt resistor of S ohms is connected across the strain gage, the output is reduced to A $(\Delta G/G)$ where A is an attenuation constant having a value between 0 and 1 and is approximately equal to $A=S/(S+G)$. Now, the output of a strain gage bridge may be expressed as $\Delta E/V$ where $\Delta E$ is the change in output and V is the applied voltage. Thus, for a load at the center c (FIG. 9) of the scale platform:

$$(\Delta E/V)_c = \tfrac{1}{4}\{(\Delta G_1/G_1) - (\Delta G_2/G_2) + (\Delta G_3/G_3) - (\Delta G_4/G_4)\} \quad (1)$$

Now, if the load is shifted to position e on the platform the output of the bridge becomes $$\left(\frac{\Delta E}{V}\right)_e = \quad (2)$$

$$\tfrac{1}{4}\left(\frac{\Delta G_1 + r_1}{G_1} - \frac{\Delta G_2 + r_2}{G_2} + \frac{\Delta G_3 + r_3}{G_3} - \frac{\Delta G_4 + r_4}{G_4}\right)$$

where $r_1, r_2, r_3$ and $r_4$ represent the change in the output of the respective strain gages due to shifting of the load from c to e. Subtracting equation (1) from equation (2):

$$(\Delta E/V)_e - (\Delta E/V)_c = \tfrac{1}{4}\{(r_1/G_1) - (r_2/G_2) + (r_3/G_3) - (r_4/G_4)\} \quad (3)$$

Now connecting a test shunt resistor S across strain gages 1 and 2 and with the load at c $$(\Delta E/V)_{cS} = \tfrac{1}{4}\{A_T(\Delta G_1/G_1) - A_T(\Delta G_2/G_2) + (\Delta G_3/G_3) - (\Delta G_4/G_4)\} \quad (4)$$

where $A_T$ is the attenuation produced by the test shunt resistor. With the load now shifted to e $$\left(\frac{\Delta E}{V}\right)_{eS} = \tfrac{1}{4}\left\{A_T\left(\frac{\Delta G_1 + r_1}{G_1}\right) - A_T\left(\frac{\Delta G_2 + r_2}{G_2}\right) + \frac{\Delta G_3 + r_3}{G_3} - \frac{\Delta G_4 + r_4}{G_4}\right\} \quad (5)$$

Now subtracting equation (4) from (5)

$$(\Delta E/V)_{eS} - (\Delta E/V)_{cS} = \tfrac{1}{4}\{A_T(r_1/G_1) - A_T(r_2/G_2) + (r_3/G_3) - (r_4/G_4)\} \quad (6)$$

Subtracting equation (6) from (3)

$$\tfrac{1}{4}\{(r_1/G_1) - A_T(r_1/G_1) - (r_2/G_2) + A_T(r_2/G_2)\}$$

$$\tfrac{1}{4}\{(1-A_T)(r_1/G_1) - (1-A_T)(r_2/G_2)\} = \tfrac{1}{4}(1-A_T)\{(r_1/G_1) - (r_2/G_2)\} \quad (7)$$

Assume, for example, that a 4,000 ohm shunt resistor across gages 1 and 2 reduces the shifting error (position c to position e, FIG. 9) from 54 units to 34. To more fully correct for the shifting error and obtain a corresponding final attenuation $A_F$ and value of shunt resistor to produce the correction, it follows from (7)

$$\frac{1-A_T}{1-A_F} = \frac{54-34}{54-0} = \frac{20}{54} \quad (8)$$

but $$A_T = 4000/(4000+350) = 0.9195$$

so the final A should be $A_F = 0.783$.

Alternatively, the midpoint between the test values for the test shunt across gages 1 and 2 and the test value of 65 with the shunt across gages 3 and 4 may be used instead of the test value obtained with no shunt resistors connected to the bridge.

Thus:

$$\frac{1-A_T}{1-A_F} = \frac{\tfrac{1}{2}(65+34) - 34}{\tfrac{1}{1}(65+34) - 0} = \frac{49.5-34}{49.5} = \frac{15.5}{49.5} \quad (8A)$$

and $A_F = 0.743$ and $S = 1012$ ohms. This method usually gives a better approximation of the desired value of the shunt resistor.

The example above involved compensation for transverse shift only, that is, from point c toward point e (or point j) in FIG. 9. If it is desired to compensate for longitudinal shift only, that is, from point c to point b, the above procedure may be followed. The values obtained with the test shunt resistors across either strain gages 2 and 3 or 1 and 4 or across both pairs would be used in this instance.

There is an interaction between the transverse and longitudinal shift compensations. If corrected independently, when one compensation is made it will change the amount of compensation required for shift of the other type. Thus, numerous corrections would have to be made in an iterative manner until the shift specifications are met. This approach is slow and costly.

In accordance with an aspect of the present invention, equations are written representing both the required longitudinal and transverse corrections. The constants are determined by tests and then the desired amount of correction or compensation is determined.

For example, let $$Y = Ay + Bx + E \text{ and} \quad (9)$$

$$X = Cy + Dx + F \text{ where}$$

y is the change in indicated weight observed when the applied load is shifted in one direction, identified as the y direction, and is a function of the values of the test compensating resistors;

x is the change in indicated weight observed when the applied load is shifted in a direction substantially orthogonal to the y direction and identified as the x direction, and is a function of the values of the test compensating resistors;

Y is the change in load shift error resulting from the addition of compensating resistors to either opposite pair of adjacent strain gages, for example gages 2, 3 or 4, 1 in FIGS. 9 and 10;

X is the change in load shift error resulting from the addition of compensating resistors to either opposite pair of adjacent gages not used in determining Y, for example gages 1,2 or 3,4; and A, B, C, D, E, and F are constants.

As defined above, the values of X and Y are substantially independent of each other. The units of Y, X, y, and x are increments of weight or, more specifically as used in the examples, counts. Also, it should be noted that the x and y directions do not necessarily correspond to transverse and longitudinal directions on platform 90.

One way to determine the constants in equation (9) is to place a test weight on platform 90 in different positions with test compensating resistors connected to different pairs of strain gages and utilize the output indications from indicator 26. One procedure utilizes data from placing the test weight at positions b, e, g and j or at positions a, d, f and h, as shown in FIG. 9, with test compensating resistors connected to the various pairs of strain gages. Table I below shows one set of such data where the test compensating shunt resistor S is again 4000 ohms.

TABLE I

| Position | $R_1, R_2$ | $R_2, R_3$ | $R_3, R_4$ | $R_4, R_1$ |
|---|---|---|---|---|
| a | 13271 | 9791 | 12442 | 15970 |
| d | 13508 | 9871 | 12298 | 15984 |
| f | 13326 | 10938 | 12127 | 14564 |
| h | 13088 | 10888 | 12258 | 14508 |
| $a - f = x_n$ | −55 | −1147 | +315 | +1406 |
| $d - h = y_n$ | +420 | −1017 | +40 | +1476 |

In Table I, the differences between the readings at diagonally opposite corners (a,f and d,h in FIG. 9) of platform 90 are determined and recorded as x and y values with test compensating resistors in place across the respective sets of strain gages. Readings need not be taken without test compensating resistors in place so that there is not a "No R" column in Table I. The "No R" points are determined from Table I as will become apparent below.

Figure 12:
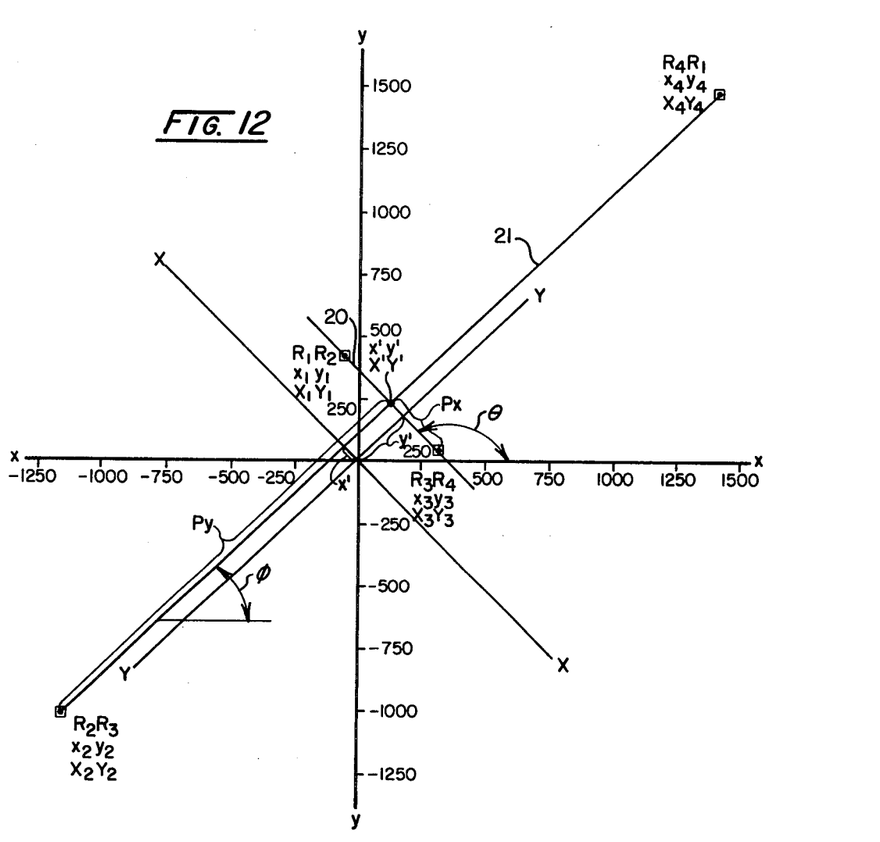
FIG. 12 is a graph showing the effect of connecting compensating resistors to the strain gages.

If the data from Table I are plotted on an x-y axis as shown in FIG. 12, one line 20 can be drawn through the points for $R_1R_2$ and $R_3R_4$ and another line 21 intersecting the first through the points for $R_2R_3$ and $R_4R_1$. The lower the value of the test compensating shunt resistors S connected to the strain gages, the further the plotted points are from the intersection of the lines. The intersection is close to the uncompensated or "No R" point for load shift in either or both of the x and y directions. Changes in shift produced by placing shunt resistors across a pair of strain gages is represented by movement along the proper line. Increasing values of shunt resistors move the point along the line toward the intersection while decreasing values move it away from the intersection.

Since the origin of the x,y axis represents the point of zero load shift error and the point x',y' represents the load shift error without compensation, complete compensation for load shift can be obtained by placing the appropriate compensating resistance values across the appropriate strain gages such that the point x',y' is made to coincide with the origin of the x, y axis. In accordance with the present invention the proper values of compensating resistances to accomplish this may be determined mathematically using FIG. 12 and Table I. First, the x,y axes are rotated to define X,Y axes parallel to the respective intersecting lines 20, 21. The X and Y coordinates (X',Y') of the point x',y' can then be determined to obtain the appropriate values of compensating resistors required.

The relationship of the x,y axes to the X,Y axes is given by $$y = Y \sin \phi + X \sin \theta, \text{ and} \quad (10)$$

$$x = Y \cos \phi + X \cos \theta$$

where $\phi$ and $\theta$ are the angles shown in FIG. 12. Solving for Y and X yields $$Y = \frac{\cos \theta}{\sin (\phi - \theta)} y - \frac{\sin \theta}{\sin (\phi - \theta)} x \quad (11)$$

$$X = -\frac{\cos \phi}{\sin (\phi - \theta)} y + \frac{\sin \phi}{\sin (\phi - \theta)} x$$

Solving for the coordinates X',Y' of the point x',y' in the X,Y coordinate system $$Y' = \frac{\cos \theta}{\sin (\phi - \theta)} y' - \frac{\sin \theta}{\sin (\phi - \theta)} x'$$

$$X' = -\frac{\cos \phi}{\sin (\phi - \theta)} y' + \frac{\sin \phi}{\sin (\phi - \theta)} x'$$

where y' and x' are, as previously defined, the intersection coordinates of the lines 20,21. y'=230.0 and x'=130.0 Now solving for Y' and X'

Y'= −253.60; X'= −73.73 from FIG. 12 and Table I.

The slope of each line is the tangent of the angle of inclination of the X-axis

| $\tan \phi =$ | 0.9765 | $\tan \theta =$ | −1.027 |
|---|---|---|---|
| $\phi =$ | 44.32° | $\theta =$ | 134.24° |
| $\sin \phi =$ | 0.6987 | $\sin \theta =$ | 0.7164 |
| $\cos \phi =$ | 0.7155 | $\cos \theta =$ | −0.6977 |
| | $\sin (\phi - \theta) =$ | 1.000 | |

From this point the calculated values X' and Y' are utilized with the actual change caused by the test shunt resistors to determine the size of the needed final compensating resistors.

The next step is to find $A_{FY}$, the final attenuation term for changes in Y direction. From this the final trim resistors $S_{FY}$ can be calculated. As in equation (8), a ratio is formed $$\frac{1 - A_{TY}}{1 - A_{FY}} = \frac{P_Y}{Y'}$$

where $P_Y$ is the weight change between the weight represented by the point x',y' (or X',Y') and the weight represented by the coordinates of the test reading on line 21 in the direction of the needed correction. This weight change is represented in FIG. 12 by the distance along line 21 from x',y' to $x_2,y_2$. In this example, from Table I and FIG. 12

$$P_Y = \sqrt{(-1017 - 230)^2 + (-1147 - 130)^2} = 1784.86$$

Also from equation (8), with a test resistance of 4000 ohms, $A_{TY}$=0.9195 and 1−$A_{TY}$=0.0805. Then $$0.0805/(1 - A_{FY}) = 1784.86/253.60$$

$A_{FY}=0.9886=S_{FY}/(S_{FY}+G)$, and $G=350$ ohms $S_{FY}=30,244$ ohms.

Similarly for $A_{FX}$ $(1-A_{TX})/(1-A_{FX})=P_X/X'$ $P_X$ is represented in FIG. 12 by the distance along line 20 from $x',y'$ to $x_1,y_1$.

$P_X = \sqrt{(40-230.0)^2 + (315-130.0)^2} = 265.19$ $1-A_{TX}=0.0805$ $0.0805/(1-A_{FX})=P_X/X'=265.19/73.73$ $A_{FX}=0.9776$ $S_{FX}=15,289$ ohms.

Thus, a 15,289 ohm resistor should be placed across gage 4, and a 30,244 ohm resistor placed across gage 2. Combining $S_{FX}$ and $S_{FY}$ in $(S_{FX} \cdot S_{FY})/(S_{FX}+S_{FY})$ gives a resistor of 10,155 ohms to be placed across gage 3.

Thus, the error due to shifting of the weight on the scale platform may be reduced to a very small value.

As mentioned above, the test and final resistor networks connected to the strain gages may include series resistors rather than shunt resistors as in the exemplary embodiment described. In that case the attenuation factor A for a series resistor connected to the strain gage must be used instead of that for a shunt resistor. The attenuation factor for the series resistor is $A=G/(G+T)$ where G is the resistance of the strain gage and T is the resistance of the series resistor. Except for using series resistors and the attenuation factor A for the series resistors, the procedure and calculations for compensating for load shifts are the same as those described above.

What is claimed is:

1. An improved method of compensating a weighing mechanism having a single beam load cell member, comprising the steps of mounting a first strain gage on one side of the beam member near an end thereof, mounting a second strain gage on the other side of the beam near the same end, positioning said first and second strain gages at opposite angles to the longitudinal axis of the beam to increase the sensitivity of said gages to off-center loading of the beam, mounting third and fourth strain gages near the other end of the beam, arranging the gages in an electrical bridge circuit, and connecting a resistor network to one or more of the gages to make the output of the bridge circuit substantially independent of the position of a weight along at least one direction of the weighing mechanism.

2. An improved weighing mechanism comprising, in combination, a single beam member, first and second strain gages mounted on the beam member at angles to the longitudinal axis of the beam member to increase the sensitivity of said gages to off-center loading of the beam member, and a resistor network connected in circuit with at least one of said strain gages to make the output of the weighing mechanism substantially independent of the position of a weight along at least one of two mutually perpendicular directions on the weighing mechanism.

3. A weighing mechanism according to claim 2 wherein said gages are mounted at opposite angles to the longitudinal axis of the beam.

4. A weighing mechanism according to claim 2 wherein said gages are mounted on opposite sides and near the same end of the beam.

5. A weighing mechanism in accordance with claim 2 wherein said gages are mounted on the same side and near opposite ends of the beam.

6. A weighing mechanism according to claim 2 further comprising a base member, a weight receiving member, means for supporting one end of the beam member on the base member, and means for supporting the weight receiving member at one edge thereof by the other end of the beam member.

7. A weighing mechanism in accordance with claim 6 wherein the load cell beam member is substantially the same length as one dimension of the weight receiving member.

8. A weighing mechanism in accordance with claim 2 wherein said beam member comprises a flat beam having a reduced section near each end formed by notches in the edges, said strain gages being mounted on the beam near the reduced sections.

9. A weighing mechanism in accordance with claim 8 wherein one strain gage is mounted on one side of the beam near the reduced section at one end at a clockwise angle relative to the longitudinal axis of the beam and the other strain gage is mounted at a counter-clockwise angle on the same side at the other end of the beam.

10. A weighing mechanism in accordance with claim 8 wherein a strain gage is mounted on one side of the beam near the reduced section at one end at a clockwise angle relative to the longitudinal axis of the beam and another strain gage is mounted at a counter-clockwise angle on the other side at the same end of the beam.

11. A weighing mechanism in accordance with claim 2 further comprising third and fourth strain gages mounted on the beam, said gages being arranged in an electrical bridge circuit, the output of the bridge circuit being substantially independent of the position of a weight along at least said one direction.

12. A weighing mechanism in accordance with claim 11 wherein said first and second strain gages are mounted on the same third and fourth strain gages are mounted on the other side near opposite ends of the beam.

13. A weighing mechanism in accordance with claim 11 wherein said third and fourth strain gages are rotated at mutually opposite angles with respect to the longitudinal axis of the beam.

14. A weighing mechanism in accordance with claim 11 wherein said first and second strain gages are mounted on opposite sides of the beam near the same end thereof and said third and fourth strain gages are mounted on opposite sides of the beam near the other end thereof.

15. A weighing mechanism in accordance with claim 11 including resistor networks connected to two of the strain gages to make the output of the bridge circuit substantially independent of the position of a weight along said one direction.

16. A weighing mechanism in accordance with claim 11 including resistor networks connected to three of the strain gages to make the output of the bridge circuit substantially independent of the position of a weight on the weighing mechanism.

17. A method of compensating a weighing mechanism having a single beam load cell member with longitudinal and lateral axes, comprising the steps of mounting first and second strain gages on the beam member at opposite angles to the longitudinal axis of the beam to increase the sensitivity of said gages to off-center loading of the beam, mounting third and fourth strain gages on the beam, arranging the gages in an electrical bridge circuit, and connecting a resistor network to one or more of the gages to make the output of the bridge circuit substantially independent of the position of a weight along at least one of said axes.

18. A weighing mechanism comprising a single beam member having longitudinal and lateral axes, first and second strain gages mounted on said beam at opposite angles to the longitudinal axis to increase the sensitivity of said gages to off-center loading of said beam, third and fourth strain gages mounted on said beam, said strain gages being arranged in an electrical bridge circuit, and a resistor network connected to one or more of the gages to make the output of the bridge circuit substantially independent of the position of a weight along at least one of said axes.

19. A weighing mechanism in accordance with claim 18 wherein said third and fourth strain gages are mounted on said beam at mutually opposite angles to the longitudinal axis of the beam.

20. An improved weighing mechanism comprising, in combination, a single bending beam member for producing bending strain in response to loads applied thereto, first and second strain gages mounted on opposite sides of said beam near the same end thereof, said gages being rotated at opposite angles relative to the longitudinal axis of said beam to increase the sensitivity of said gages to off-center loading of said beam, third and fourth strain gages mounted on the other end of said beam, said gages being arranged in an electrical bridge circuit, and a resistor network connected to one or more of said gages to make the output of the bridge circuit substantially independent of the position of a weight along at least one direction of the weighing mechanism.

* * * * *